INVENTORS
MARCEL J. E. GOLAY
HAROLD A. ZAHL
BY
ATTORNEYS

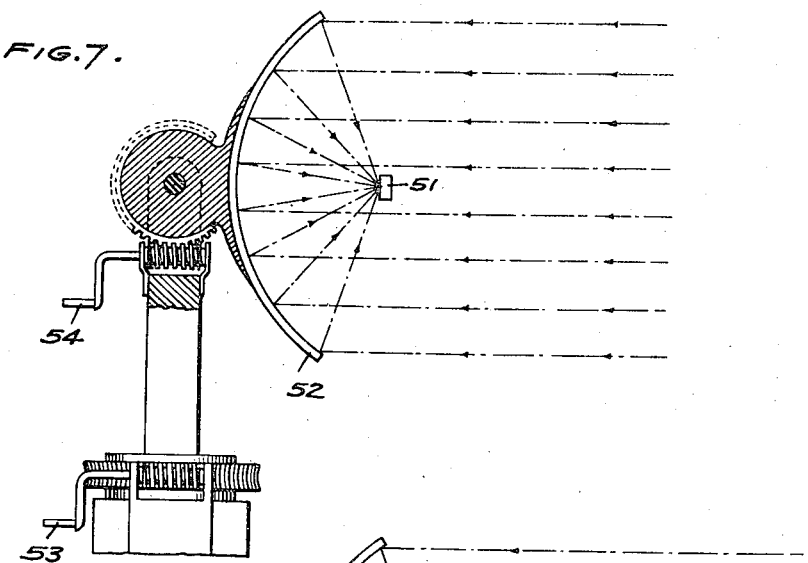
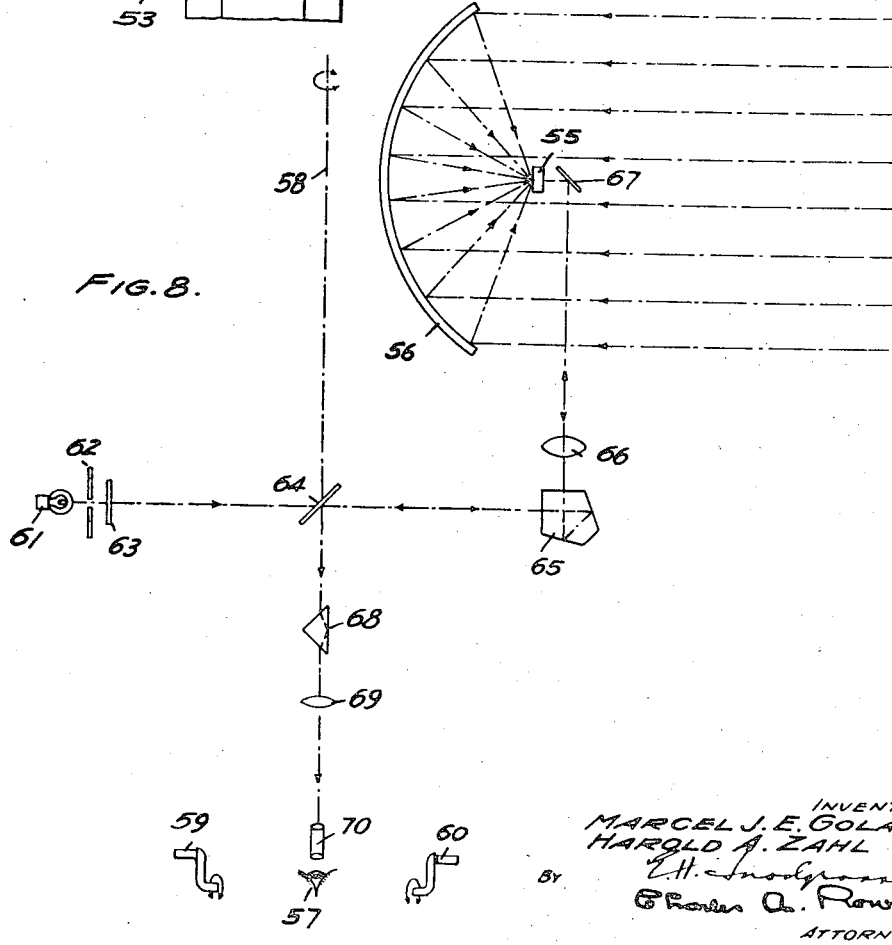

Patented Aug. 5, 1947

2,424,976

UNITED STATES PATENT OFFICE 2,424,976

SYSTEM FOR DETECTING SOURCES OF RADIANT ENERGY

Marcel J. E. Golay and Harold A. Zahl, Fort Monmouth, N. J., assignors to the Government of the United States of America, as represented by the Secretary of War Application June 12, 1939, Serial No. 278,630

25 Claims. (Cl. 250—83)

(Granted under the act of March 3, 1883, as amended April 30, 1928; 370 O. G. 757)

The invention described herein may be manufactured and used by or for the Government for governmental purposes, without the payment to us of any royalty thereon.

The present invention relates broadly to detecting and indicating radiant energy and proposes a radiation detecting and indicating device which will be responsive substantially to all forms of radiant energy whether emanating from an original source, a reflector or a sink of said energy.

A special feature of this invention consists in its sensitivity to all electromagnetic radiation in the visible, ultraviolet, and infrared spectra, and its ability to give an indication with simple and portable equipment. For particular purposes, some of which will be enumerated, the device has characteristics which make it more desirable to use than conventional thermopiles, bolometers, or photocells with associated galvanometers, amplifiers and other complicated apparatus.

A main object of the invention is to provide means whereby a multiplicity of points of information are simultaneously obtained in such a manner as to give indication of the size, form and movement of a source or sink of radiant energy.

Still another object of the invention is to provide means of detecting a source or a sink of radiant energy against a similarly radiating background.

A most important object of the invention is to provide an indicating device for thermal radiation, which when placed in the focus of a mirror will provide an observer with sufficient information concerning the movement of a thermally radiating body, so that said body, which may be a ship or an airplane, may be continuously tracked even though not visible to the eye.

An important incidental feature of the present invention is the arrangement of an optical system by which the visual field appears fixed to an observer even though the thermal field may change in azimuth or in elevation.

The operation of the device described herein depends essentially upon the visual indication of minute distortions produced in a suitably flexible thin film by gas pressures acting on one surface of the film where these pressures are related to and caused by radiant energy falling on the device.

This invention consists in the features of construction, mode of operation and in the combination and arrangements of parts hereinafter more fully described, with reference to the accompanying drawings in which:

Fig. 7 illustrates a means for utilizing the device, as illustrated by both Figs. 5 and 6, for tracking objects radiating energy which is absorbed by the device; and Fig. 8 illustrates a preferred optical system for use when the device is employed as in Fig. 7 for detecting moving radiating objects.

Figure 1:
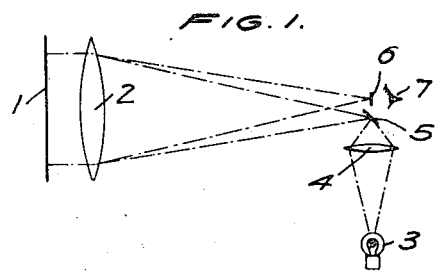
Fig. 1 illustrates an optical system for detecting minute unevenness in the surface of a thin flexible film.

Referring now more particularly to Fig. 1, an optical method has been illustrated which serves to bring out the unevenness of an almost plane surface which may be the thin flexible film referred to. In the illustration, I is the film, 2 is a suitable optical converging lens, 3 is a point source of light, and 4 is an accessory optical lens which creates an image of the point source of light 3 on a small mirror 5. After traversing lens 2 the light rays are substantially parallel and they strike thin film I which is assumed momentarily to form a plane surface. The parallel rays of light reflected by 1 are reconverged by lens 2 on 6 where they form a second image of light source 3. Numeral 6 designates a small opaque screen just large enough to blot out substantially all light which might otherwise reach observer's eye located as at 7. If, however, thin film 1 departs from a plane in some of its parts, these parts will reflect the light from 5 at a slightly different angle, and all the light will not fall on 6, but some will reach the observer's eye. The thin film will then appear to the observer as if it were illuminated in those parts which are not in the general plane of the film.

A preferred optical method has been illustrated in Fig. 2, in which 8 is again the thin flexible film referred to, and 9 is a portion of a glass wedge, the surfaces 10 and 11 of which are plane but spread at a slight angle so as not to produce interference rings when viewed in monochromatic light. A source of light 12, either monochromatic or made substantially so by filter 13, is collimated by a small aperture in baffle 14 and directed at a half-silvered mirror 15 from which half of the incident light is reflected onto lens 16. By half-silvered mirror is meant a mirror on which a very thin coating of silver has been deposited, so that a portion of the light incident thereon is reflected and a portion is allowed to pass through. From lens 16 the light emerges as a substantially parallel beam and passes through glass wedge 9 and to thin film 8 with a slight loss due to reflection from each surface. The light reflected by thin film 8 and side 10 of wedge 9 is converged by lens 16 onto observer's eye 17 after suffering a partial reflection at the half-silvered mirror 15. If thin film 8 and glass surface 10 be assumed plane and exactly parallel, the field will appear uniformly illuminated to the observer. Any small departure from parallelism causes interference fringes to appear, and these will become concentric rings if the unevenness is symmetrical about a point. The optics involved in this phenomenon are well known to those skilled in the art, such concentric interference rings being usually referred to in textbooks as "Newton's rings."

In the above, two optical systems have been disclosed, the latter in particular being capable of indicating very small distortions of thin films. Variations of the above systems that can be made by those skilled in the art fall within the scope of the present invention.

Before discussing the physical phenomena involved in distorting thin films by radiation, a few words concerning extremely thin flexible films will possibly make the invention more readily understood. These films have been constructed in a variety of ways and have been made of numerous materials. A preferred film may be made from a mixture of cellulose nitrate, Glyptal cement, and castor oil, all dissolved in amyl acetate. A drop of this material on water will spread to a thin film and after the volatile components have escaped the remaining film may be picked up and used as described herein. Films may easily be obtained the thickness of which is only a fraction of the wavelength of visible light. These films are both extremely flexible and durable and may be distorted to an appreciable fraction of their diameter with almost instant recovery when the force of distortion is removed. This invention is not restricted to the particular films made as described above; any suitable film comes within the scope of this invention.

The general operation of this invention utilizes the increased or decreased thermal energy of a gas that surrounds a substance which absorbs the electromagnetic radiation that it is desired to detect. Essentially, the absorbing substance is inclosed in a chamber, one wall of which consists of a window transparent to the radiation it is desired to detect, and part of another wall of the same or some other communicating chamber consists of a thin flexible film. Thus, when the temperature of the gas in the chamber so defined is raised or lowered by the absorption of varying amounts of radiant energy the pressure increase or decrease is indicated by movement of the film which may be viewed by one of the optical methods previously discussed.

Figure 2:
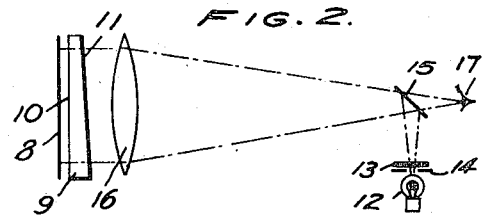
Fig. 2 illustrates a second and preferred optical system for detecting unevenness in the surface of a thin flexible film.
Figure 3:
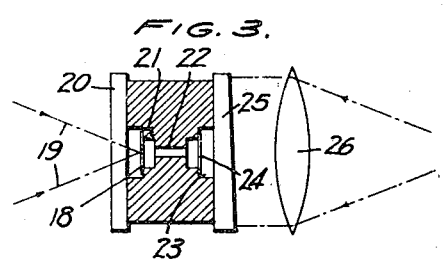
Fig. 3 illustrates a method of applying on one surface of a thin flexible membrane the increased gas pressure obtained when electromagnetic radiation incident on an absorbing body is converted into thermal energy.

More specifically, consider Fig. 3 in which 18 is a substance of low specific heat such as a thin film as previously described or any material blackened or otherwise treated so as to absorb radiant energy 19 which falls upon it through window 20 which is transparent to the radiation it is desired to detect. The part 18 may conveniently consist of a film as previously described, suitably blackened, and preferably sufficiently flexible so that the variation in the pressure of the gas in the chamber to the left of the film will add to the variation in the pressure of the gas to the right of the film. Should a stiffer film be used, a leakage path 21 between the two sides of the film may be introduced which maintains equal pressure on both sides. A passage 22 connects the chamber in which radiant energy is converted into molecular energy with another chamber 23 having an offset which is finely ground and polished and across which a thin flexible film 24 is stretched. Film 24 forms the partially reflecting optical surface referred to as 1 and 8 in Figs. 1 and 2. When the gas pressures on both sides of the film are equal the surface is substantially flat. Pressure equalization will immediately be destroyed when the amount of radiation falling on 18 varies and the film will bulge to the left or to the right depending on whether the incident radiation has decreased or increased. This movement of the film may be viewed through window 25, lens 26, etc., by one of the aforementioned optical systems.

Figure 4:
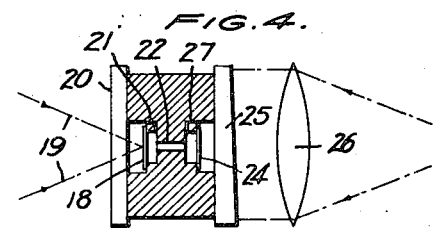
Fig. 4 illustrates another method of applying on one surface of a thin film the increased gas pressure obtained when electromagnetic radiation incident on an absorbing body is converted into thermal energy.

The device illustrated in Fig. 4 differs from the one illustrated by Fig. 3 only in the addition of equalizing duct 27. The dimensions of duct 27 may be so chosen that the pressure on both sides of the film 24 will be kept equal when but slow changes in ambient temperature occur, whereas the sudden heating or cooling of the radiation absorbing material 18 due to sudden variations in the radiant energy impinging upon it will cause a detectable differential pressure across this film 28, owing to the resistance offered by duct 27 to the passage of the gas. The dimensions of the chambers and duct 27, and the nature and state of the gas will determine a time constant for this device that may be varied at will, and so adjusted as to fit any particular use to which the device may be put.

Figure 5:
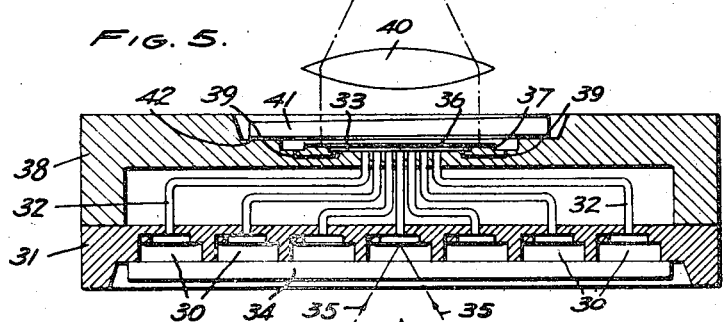
Fig. 5 illustrates a method of so grouping units, such as those illustrated by Fig. 4, that the distortion of particular portions of a common thin film may be observed.

Fig. 5 illustrates a device embodying the same principle as the device illustrated in Fig. 4, but designed to provide a multiplicity of points of information. A number of units 30, similar to the individual unit shown in Fig. 4, are constructed symmetrically about the center of metal disk 31. For convenience of observation, and to reduce the size of the optical components, the individual cells are connected by a plurality of tubes 32 to a plate 33 of relatively small area. The units of the mosaic 30 are individually sealed by window 34 transparent to the incident radiation 35 it is desired to detect. Any pressure change due to sudden variations of the incident radiation on any of the cells 30 is accompanied by a flow of gas in the vicinity of the outlet of the cells affected in mosaic 33. This flow of gas continues until a new equilibrium is reached. Thin film 36 is supported by a raised metal ring 37 which forms an integral part of metal disk 38. Surface 33 and thin film 36 are very close together but not in actual contact. Therefore, any change in pressure in any of the cells 30 tends to move particular areas of thin flexible film 36 in a direction depending on the sense of the pressure change. Thin film 36 subsequently becomes plane again because the radiation absorbing substance in each particular cell has almost negligible specific heat and pressure equilibrium soon obtains on both sides of the film because of gas leakage between surface 33 and film 36, and from one side of film 36 to the other through several ducts 39, two of which are shown.

Lens 40 forms part of the optical system illustrated by Fig. 2 which is incorporated in the device illustrated by Fig. 5. An optical element in the form of glass wedge 41 is supported by and cemented or otherwise secured to offset 42 which is so machined as to make the inner surface of the wedge 41 parallel to film 36. With the arrangement described, pressure variations occurring in any of the cells 30 will cause a number of concentric interference rings to appear in a position on film 36 which will depend upon which of the particular cell or cells undergo temperature variations. If the source of radiation be focused by an optical system such as a first surface parabolic mirror and if the mosaic 33 is of sufficiently fine structure, then the movement of the focused radiation across the field defined by the cell structure 30 may be made to appear almost as a smooth movement of the concentric interference rings across the field of visual observation, whereby the observer can ascertain the direction of the movement of the incident radiation.

Figure 6:
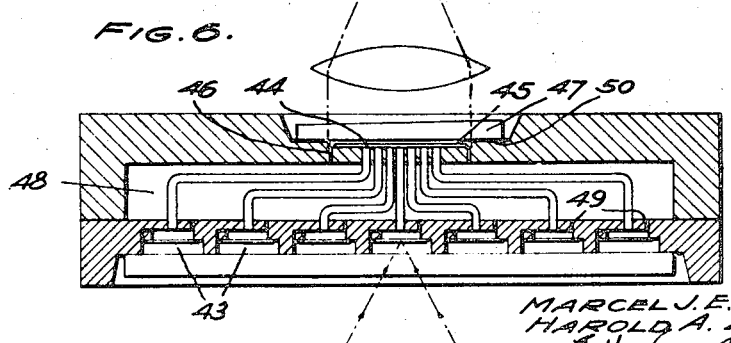
Fig. 6 illustrates another method of grouping units such as those illustrated by Fig. 4, whereby individual units completely retain their identity and affect individual films.

Fig. 6 illustrates a more sensitive design in which a large number of indicating cells are grouped in one structure, each cell being connected with an individual indicating film. In this design the outputs of the various individual cells 43 are again, for convenience, concentrated by metal tubing to a smaller area 44. The area 44 is machined and polished so as to be flat and a thin film 45 is stretched across it so as to individually seal the openings of the metal tubes which lead to cells 43. A number of ducts 46 (two shown) connect the volume between surface 44 and glass wedge 47 to the volume 48. Individual cells 43 are connected to volume 48 by means of ducts 49. In operation, when there is a change in the radiation falling upon any one of the absorbing films of cells 43, the resulting pressure change is communicated to the particular indicating films 45 of mosaic 44 and the films move in one way or the other depending upon the sense of the radiation change. The pressure change is of a transient nature because ducts 49 provide a path for gas flow and pressure equalization on the two sides of the films on mosaic 44 takes place at a rate depending on the resistance offered by ducts 49 to the gas flow. The time constants of the various cells may thus be controlled in the selection of the dimensions of ducts 49. Movement of the films on mosaic 44 may be observed by one of the optical systems aforementioned. In the illustration, the preferred system of Fig. 2 is shown. Glass wedge 47 is supported by and cemented to offset 50 which is so machined as to make the inner surface of 47 substantially parallel to the film-supporting mosaic 44. In operation, therefore, changes in the radiation falling on one or more of the cells 43 are seen by the observer as concentric interference rings appearing on the corresponding films 45 of mosaic 44. These concentric interference rings may be observed until pressure equalization on the two sides of the films takes place through ducts 49 and 46.

The radiation indicating device described may be used for a variety of purposes. It is, however, preferably suitable as a tracking device for bodies such as ships and airplanes which may be invisible because of darkness but are good emitters of thermal radiation. In Fig. 7 there is shown a radiation indicating device 51 of the type illustrated by either Fig. 5 or 6, placed in the focus of parabolic mirror 52. Mirror 52 must have an adequate mounting and associated control mechanisms 53 and 54 so that it may be traversed in both azimuth and elevation. The preferred optical system illustrated by Fig. 2 forms a part of the device but is not shown because of the added details and the reduced scale of the drawing, but will however be discussed in connection with Fig. 8. An important feature of this invention, when adapted to the tracking of distant craft, is its inability to detect differences between ambient and background temperature, or slow variations of background temperature, when searching the horizon or sky. Only the comparatively sudden pressure changes due to the sweep of the image of the body whose temperature differs from its background will be detected and will give a clue as to the presence of such a body. A second important feature of this invention is the simplicity with which a large number of indicating cells may be combined into one unit providing thereby a large amount of information which is highly important when a continuous track is desired on a rapidly moving source of radiation such as an airplane.

In Fig. 8 is shown one optical system which has several desirable features and may be used in conjunction with the arrangement illustrated by Fig. 7. The device 55 of Fig. 5 or 6 is mounted in the focus of parabolic mirror 56. The control operator whose eye is represented by 57, rides on a seat which moves in azimuth but not in elevation with mirror 56. The seat is so adjusted that the observer's eye conveniently looks down the axis 58 of the mirror about which changes in elevation take place. Cranks 59 and 60 are located so as to be easily accessible to the operator and are geared to the mirror mounting so as to provide a control in both azimuth and elevation. The components of the optical system include source 61 of visible monochromatic radiation, collimating aperture 62, filter 63, half-silvered mirror 64, pentaprism 65, lens 66, full reflecting mirror 67, right angle prism 68, and an observing telescope with objective lens 69 and eye piece 70. All items shown in Fig. 8 excepting 57, 59 and 60 turn with mirror 56 in both azimuth and elevation. Items 57, 59 and 60 turn only with the mirror 56 in azimuth. Mirror 64, prism 68, lens 69 and eyepiece 70 are centrally located with respect to shaft 58 and turn with the mirror about this shaft with the exception that prism 68 is geared to the axis 58 (gears not shown) in such a manner that, while it rotates with 58, there is a counter-rotation superimposed so that when viewed from a fixed point the angular movement of 68 is in the same sense as the other components rigidly fastened to the structure of 56 but its angular change is only one-half. Thus, if mirror 56 is turned 90 degrees in a direction counterclockwise to a fixed observer, prism 68 only moves 45 degrees in the same direction. In operation, near-monochromatic light from 61 is collimated by aperture 62, passes through filter 63 in which its monochromatic value is further increased, and falls on half-silvered mirror 64. Mirror 64 reflects half of the incident light away from the observer and half is transmitted on to pentaprism 65 on the surfaces of which two reflections occur, the final reflection directing the light through lens 66, on emerging from which it is substantially parallel. The parallel beam of light from lens 66 is reflected by mirror 67 through the optical wedge and the thin film or films which make up the thermal indicating unit 55. The reflected component from the indicating film or films and the component reflected from the parallel surface of the optical wedge return on the same optical path up to half-silvered mirror 64 where they are partly reflected towards the observer after passing through prism 68 where they undergo one reflection but no change in path and then directly through lenses 69 and 70 of the observing telescope. It is deemed unnecessary to follow the various image reversals, introduced by an optical system as described. All the individual components and their individual properties are well known to those skilled in the art and the final result only need be mentioned. The complete optical system acts so as to make the visual field symmetrical with respect to the thermal field. Thus a target passing across the thermal field, for example, from right to left, will appear to pass across the visual field from right to left, the azimuth and elevation changes required to keep the target centered being then obvious to the observer. In addition, because of the angular rotation superimposed on prism 68, the visual field of the observer always appears fixed regardless of the azimuth or elevation of the system. The advantage of the described system is indicated by the fact that if prism 68 rotated about axis 58 with the same angular velocity as 56, visual-thermal symmetry would be destroyed and the observer would always have to bear in mind that the visual image shifts with the thermal field.

We claim:

1. In a device for the detection of radiant energy, a flexible diaphragm and means including a radiation-absorbing substance responsive to changes in radiant energy to effect changes in pressure on said diaphragm; and means including an optical system for visualizing the distortion of said diaphragm due to said changes in pressure.

2. In a device for the detection of radiant energy, means comprising a radiation-absorbing substance of low specific heat; a flexible film, said film being normally flat and subject to deformation in response to incident radiation by said radiation-absorbing substance; an element having one of its surfaces disposed as a plane reference surface substantially parallel with said film; and means for visualizing the interference pattern resulting from said deformation when viewed by monochromatic light reflected from said film and said reference surface.

3. In a device for the detection of radiant energy, means responsive to changes in radiant energy, said means including a substance characterized by its radiation-absorbing qualities and its low specific heat a flexible film subject to deformation as a result of the absorption of radiation by said substance; and an optical system for obtaining a visual indication of the interference pattern resulting from deformation movements.

4. A device for the detection of radiant energy comprising a first flat membrane characterized by its heat absorbing properties and low specific heat; a second flat membrane subject to distortional movements in response to radiation incident on said first membrane; and means for obtaining a visual indication of the pattern resulting from said movements, said means including an element having one of its plane surfaces disposed as a reference surface in parallelism with said second membrane and an optical system for viewing the pattern formed by light reflected from said second membrane and said reference surface.

5. A device for the detection of radiant energy comprising a first thin membranous film characterized by its low specific heat and heat absorbing properties; a second thin membranous film subject to deformation movements in response to radiation incident on said first-named film; a glass wedge having one of its surfaces disposed as a plane reference surface in parallelism with said second film a source of monochromatic lights; and an optical system for obtaining a visual indication of the interference pattern formed by monochromatic light reflected from said second film and said reference surface, and of the changes in said interference pattern resulting from said deformation movements.

6. In a device for the detection of radiant energy, means for obtaining an interference pattern in response to incident radiation, said means including a first thin membranous film characterized by its low specific heat and heat absorbing properties; a second thin membranous film subject to deformations in response to the absorption of heat by said first film, and the attendant expansion of the air surrounding said first film; and an optical element having one of its surfaces disposed as a plane light reflecting surface in spaced parallel relation with said second film; a source of monochromatic light; means including a device for directing a beam from said source upon said film; and an optical system for obtaining a visual indication resulting from changes in the interference pattern formed by said monochromatic light reflected from said second film and said reflecting surface.

7. In a device for the detection of radiant energy, means for obtaining an interference pattern in response to incident radiation, said means including a first membranous film in an enclosure, said first film being characterized by its low specific heat and heat absorbing property; a second membranous film one side of which is in fluid communication with said enclosure of said first film; and an optical element having one of its surfaces disposed as a plane reference surface in parallelism with said second film a source of monochromatic light; and an optical system for visualizing changes in the interference pattern resulting from said deformation when monochromatic light is reflected from said second film and said reference surface.

8. In a device for detecting radiant energy, means for producing an interference pattern including a first membranous film of molecular thinness, characterized by its low specific heat and heat absorping properties; a second membranous film of molecular thinness subject to deformation in response to radiation incident on said first film; an element having a plane reflecting surface disposed in close proximity to said second film; a source of monochromatic light and an optical system for visualizing the changes in the interference pattern resulting from said deformation when monochromatic light is reflected from said second film and said reference surface.

9. A device for detecting radiant energy comprising a plurality of separately sealed chambers, each containing a substance characterized by its low specific heat and absorbing qualities in response to incident radiation; a common chamber one wall of which is formed by a flat plate and another wall of which is formed by a flat reflecting surface; tubular passages in communication with said chambers and terminating into said flat plate of said common chamber; a flat plate forming one wall of said last-named chamber; an optical element having one of its faces in parallelism with said plate and said face constituting a reference surface; a flexible membrane interposed under tension between said flat plate and said flat reflecting surface; a source of monochromatic light; and an optical system for visualizing the changes in the interference fringes formed by monochromatic light reflected from said membrane and said reference surface in response to radiant energy impinging upon the radiation absorbing substance of said chambers which causes an expansion of the air in said chambers and a fluid flow which deforms said flexible membrane as it escapes from the ends of said passages.

10. A device for detecting radiant energy comprising a plurality of separately sealed chambers, each containing a substance characterized by its low specific heat and radiation absorbing qualities in response to incident radiation; tubular connections in fluid communication with said chambers and a plate terminating said connections at their opposite ends; a flexible membrane covering said plate and individually sealing each tube end; an optical element having an optically flat inner surface in parallelism with said plate and said membrane; a source of monochromatic light; and an optical system for visualizing the interference fringes caused by monochromatic light reflected from said membrane and said reference surface and the changes occurring in said interference fringes as said flexible membrane is deformed owing to the expansion and contraction of the air surrounding said radiation absorbing substance.

11. In a device for detecting radiant energy, means for producing an interference pattern in response to incident radiation from a source of energy, said means comprising a plurality of sealed chambers, each of which contains a substance characterized by its low specific heat and radiation dissipative qualities; a common chamber one wall of which is formed by a flat plate, and another wall of which is formed by a flat optical surface which serves as a reference surface; tubular passages connected at one end to said sealed chambers and terminating at their opposite ends into said flat plate of said common chamber; a thin flexible film stretched in close proximity to said flat plate; a source of monochromatic light; and an optical system for visualizing the interference pattern produced by the reflection of monochromatic light from said film and said flat optical surface, and also the changes occurring in said interference pattern owing to the movement of said film in relation to said reference surface, as said film is deformed owing to the absorption of radiation by said radiation dissipating surfaces.

12. In a device for detecting a source of radiant energy, means to produce an interference pattern in response to incident radiation from said source, said means comprising a sealed chamber encompassing a gaseous body, and including within said chamber a first thin membranous film characterized by its low specific heat and heat-absorbing properties, a second thin membranous film subject to movement as a result of the expansion of said gaseous body due to the absorption of heat by said first named film; a source of monochromatic light; and optical means for obtaining an interference pattern between monochromatic light reflected from said second film, and changes in said pattern caused by the deformation of said second film as the result of the expansion of said gaseous body when radiation impinges on said first thin membranous film.

13. In a system for the detection of radiant energy, means comprising a closed chamber encompassing a gaseous volume and including in said volume a radiation absorbing substance of low specific heat, one wall of said chamber being formed as a thin membranous film, said film being subject to deformation movements in response to changes in gas pressure due to incident radiation; a source of light; and optical means for visualizing said movements by means of light reflected from said film.

14. In a device for detecting a source of radiant energy, means to produce an interference pattern in response to incident radiation from said source, said means comprising a sealed chamber encompassing a gaseous body, and including within said chamber a first thin membranous blackened film characterized by its low specific heat, said film acting in response to said incident radiation to effect thermal expansion of said gaseous body; a second thin memberanous film; an element having an optically flat surface parallel to said second film; a passage between said chamber and the side of said second film opposite to said flat surface; a source of monochromatic light; and means for viewing the interference pattern formed by monochromatic light reflected from said second film and said flat surface, and the changes occurring in said pattern when said second film is deformed as the result of the absorption of radiation by said first film.

15. In a system for the detection of a source of radiant energy, a unit for producing an interference pattern in response to incident radiation from said source, said unit comprising a sealed chamber encompassing a gaseous body and including within said chamber a first membranous film characterized by its low specific heat and heat absorbing properties, said film acting in response to the incident radiation thereon to cause an expansion or contraction of said gaseous body; a second membranous film forming one wall of said sealed chamber, and a reflecting reference surface parallel with said second film; means comprising a parabolic reflector for concentrating incident radiation from said source upon said unit; an optical system for viewing the interference pattern resulting from the reflection of monochromatic light by said second film and said reference surface, said system including a reflecting surface arranged to rotate with respect to the said units whereby the image of the indicating surface as viewed by the observer is rendered apparently stationary.

16. In a system for detecting a source of radiant energy, means for converting said energy into molecular energy comprising a closed chamber containing a gaseous body and including in said chamber a heat absorbing substance formed as a thin membranous film characterized by its low specific heat, a second film being subject to movement in response to changes in gas pressure due to incident radiation as the result of expansion or contraction of said gaseous body; an optical system for visualizing said movement; and means for slowly relieving the pressure differential on opposite sides of said second film.

17. In a system for tracking aerial or marine targets, means for detecting thermal radiation from said targets comprising a unit for obtaining an interference pattern in response to incident radiation from the target, said unit including a closed chamber containing a gaseous body and an absorbing substance of low specific heat in the form of a thin film; a second thin film subject to deformation movements in response to changes in gas pressure due to said incident radiation; means including a parabolic reflector for concentrating incident radiation from the target upon a plurality of said units; and means for maintaining said reflector constantly in focus upon said moving target, said means including control mechanism for adjusting the reflector both in azimuth and elevation.

18. A device for detecting and indicating radiant energy comprising a chamber encompassing a gaseous volume, and including in said volume a radiation absorbing substance characterized by a low specific heat, being formed as a thin blackened membrane and constituting a partition in said chamber; fluid passages to permit fluid flow on opposite sides of said partition; a second partition in said chamber in the form of a thin flexible film responsive to rapid pressure changes produced by the gas expanding or contracting in accordance with the temperature changes of the said heat absorbing substance; means including a restricted passage for slowly relieving the pressure differential produced on the two sides of said flexible film; and optical means including a plane reference surface for observing the movement of said flexible film as these movements cause changes in the interference fringes produced by monochromatic light reflected from said film and said surface.

19. A detector of radiant energy comprising, a sealed casing enclosing a quantity of gas and having a portion of its wall transparent to the radiation it is desired to detect, a heat absorbent element located in said casing so as to receive radiations through said transparent portion, and a thin film forming another portion of the wall of said casing and having a plane face forming a partially reflecting optical surface adapted to bulge upon change of the pressure of the enclosed gas due to radiations falling on said absorbent element.

20. A detector of radiant energy comprising, a sealed casing enclosing a quantity of gas and having a portion of its wall transparent to the radiation it is desired to detect, a thin film of flexible and heat absorbent material located in said casing so as to receive radiations through said transparent portion, and a second thin film forming another portion of the wall of said casing and having a plane face forming a partially reflecting optical surface adapted to bulge upon change of the pressure of the enclosed gas due to radiations falling on said first mentioned thin film.

21. A detector of radiant energy comprising, a sealed casing enclosing a quantity of gas and having a portion of its wall transparent to the radiation it is desired to detect, a thin film of heat absorbent material located in said casing so as to receive radiations through said transparent portion and dividing the gas in the interior of said casing into two parts, a conduit connecting the gas on the opposite faces of said thin film so as to equalize the pressures on opposite sides of said film, and a second thin film forming another portion of the wall of said casing and having a plane face forming a partially reflecting optical surface adapted to bulge upon change of the pressure of the enclosed gas due to radiations falling on said first mentioned thin film.

22. A detector of radiant energy comprising, a sealed casing enclosing a quantity of gas and having a portion of its wall transparent to the radiation it is desired to detect, a heat absorbent element located in said casing so as to receive radiations through said transparent portion, a thin film forming another portion of the wall of said casing and having a plane face forming a partially reflecting optical surface adapted to bulge upon change of the pressure of the enclosed gas due to radiations falling on said absorbent element, a conduit forming a by-pass between the opposite faces of said thin film and of sufficiently small cross section as to delay the equalization of pressure on said opposite faces, and a cover of transparent material forming, together with a portion of said casing and one face of said thin film, a closed chamber in communication with one end of said conduit.

23. A radiation indicating device comprising, walls defining a plurality of chambers each filled with gas, said walls having one portion penetrable by the radiation to be indicated and another portion transparent, a flexible and radiant-energy-absorbent film located within said walls between said chambers and adjacent to said penetrable portion so that radiations passing through said penetrable portion fall thereon, and a second thin film having a partially reflecting and substantially flat optical surface located so as to form a wall of one of said chambers, whereby variation of the temperature of said first mentioned film causes a variation of the gas in said chambers which in turn causes the optical surface of said second film to vary from flat condition.

24. A radiation indicating device comprising, walls defining a plurality of chambers each filled with gas, said walls having one portion penetrable by the radiation to be indicated and another portion transparent, a flexible and radiant-energy-absorbent film located within said walls between said chambers and adjacent to said penetrable portion so that radiations passing through said penetrable portion fall thereon, a second thin film having a partially reflecting and substantially flat optical surface located so as to form a wall of one of said chambers, whereby variation of the temperature of said first mentioned film causes a variation of the gas in said chambers which in turn causes the optical surface of said second film to vary from flat condition, and a sensitive optical system for detecting the variations of said optical surface from flat condition.

25. In a device for detecting a source of radiant energy, means for producing an interference pattern in response to incident radiation from said source, said means comprising a sealed chamber and including within such chamber a membranous film characterized by its low specific heat and radiation absorbing qualities and subject to deformation in response to incident radiation; an optical reflecting element having a plane reference surface disposed in close proximity to said film; and an optical system for visualizing changes in the interference pattern resulting from deformations of said film when viewed in terms of light which is reflected from said film and said reference surface.

MARCEL J. E. GOLAY.
HAROLD A. ZAHL.

REFERENCES CITED

The following references are of record in the file of this patent:

UNITED STATES PATENTS

| Number | Name | Date |
| --- | --- | --- |
| 2,144,519 | Wilson | Jan. 17, 1939 |
| 2,188,115 | Kallmann | Jan. 23, 1940 |
| 1,862,622 | Hoffman | June 14, 1932 |
| 1,936,514 | Lengnick | Nov. 21, 1933 |
| 1,954,204 | Hayes | Apr. 10, 1934 |
| 2,074,226 | Kunz | Mar. 16, 1937 |
| 2,115,578 | Hall | Apr. 26, 1938 |
| 2,121,771 | Jones | June 21, 1938 |